United States Patent
Youn et al.

(10) Patent No.: US 6,539,570 B2
(45) Date of Patent: Apr. 1, 2003

(54) COMMUNICATION-CONTROLLED WASHING SYSTEM AND METHOD FOR OPERATING THE SAME

(75) Inventors: Sang Chul Youn, Koyang-si (KR); Kyoung Hae Han, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 09/819,735

(22) Filed: Mar. 29, 2001

(65) Prior Publication Data

US 2001/0025392 A1 Oct. 4, 2001

(30) Foreign Application Priority Data

| Mar. 29, 2000 | (KR) | 2000-16232 |
| May 26, 2000 | (KR) | 2000-28746 |
| May 26, 2000 | (KR) | 2000-28747 |
| May 26, 2000 | (KR) | 2000-28748 |
| May 26, 2000 | (KR) | 2000-28749 |
| Jun. 17, 2000 | (KR) | 2000-33468 |
| Jun. 19, 2000 | (KR) | 2000-33646 |

(51) Int. Cl.$^7$ ............................................. D06F 33/00
(52) U.S. Cl. ...................... 8/159; 68/12.02; 68/12.27
(58) Field of Search ...................... 8/158, 159; 68/27, 68/12.02, 12.27

(56) References Cited

| 2001/0049846 A1 | * | 12/2001 | Guzzi et al. | 8/158 |
| 2001/0049948 A1 | * | 12/2001 | Jo et al. | 68/12.27 |
| 2002/0040505 A1 | * | 4/2002 | Tanaka et al. | 8/158 |
| 2002/0046429 A1 | * | 4/2002 | Jeon | 8/159 |

FOREIGN PATENT DOCUMENTS

| JP | 05057100 A | * | 3/1993 |
| JP | 09298773 A | * | 12/1997 |
| JP | 11146991 | | 6/1999 |

* cited by examiner

*Primary Examiner*—Randy Gulakowski
*Assistant Examiner*—Joseph Perrin
(74) *Attorney, Agent, or Firm*—Birch, Stewart, Kolasch & Birch, LLP (57) ABSTRACT

A communication-controlled washing system and a method for operating the same, wherein at least one washing machine is remotely controllable through a communication unit. A service provider controls the use, operation completion, operation progress and fault diagnosis of a plurality of washing machines individually over a communication network, resulting in a significant reduction in time and effort required for users or managers to limit the use of machines, upgrade programs or repair faults. Further, the optimum washing mode can be performed according to a use history and environmental conditions of each machine.

21 Claims, 8 Drawing Sheets

COMMUNICATION-CONTROLLED WASHING SYSTEM AND METHOD FOR OPERATING THE SAME

BACKGROUND OF THE INVENTION

1. Field of the Invention

The present invention relates in general to a communication-controlled washing system and method, and more particularly to a communication-controlled washing system and a method for operating the same, wherein an identifier unit is installed in each washing machine to indicate a using purpose of the associated machine externally, and a service provider assigns a unique identification (ID) to each washing machine over a communication network to diagnose the presence or not of a fault in each machine, provide a self-repair or visit-repair service of a fault, upgrade, modify or add a program and provide accurate and efficient information and service to each machine, thereby performing the optimum washing mode according to a use history and environmental conditions of each machine.

2. Description of the Prior Art

With the acceleration of labor division and specialization, there have recently appeared washing machine rental enterprises and laundry enterprises such as a Laundromat service where a user can use a washing machine for a desired purpose by paying a predetermined amount of money.

Further, in a number of special-purpose buildings such as condominiums for single life or leisure, apartments for unmarried persons, hotels, commercial-residential composite buildings and the like, commercial washing machines are generally installed to perform a washing operation at a time selected by each user according to the number of washing times, a washing coarse and other functions selected by him or her. As a result, users can do the wash at low cost with no necessity for personally purchasing washing machines.

On the other hand, washing machine companies or installation managers have to pay close attention to the installation and management of a plurality of washing machines for a business or rental purpose.

For example, a Laundromat for business comprises detergents and a plurality of washing machines, each having a slot for receiving a predetermined amount of money. In each of the washing machines, a microcomputer is provided to control the operation of the associated machine. The microcomputer functions to check the amount of money received by the slot and operate the associated washing machine if the received amount is equal to a predetermined amount.

However, the washing machines in the Laundromat are high in breakdown rate due to the more frequent use than general domestic washing machines, resulting in a large amount of time and manpower being required for repairs. Further, users have the inconvenience of having to put money into the slot, and installation managers have a trouble such as money changing.

In general, a user must frequently check a washing machine in use to recognize the state of a washing operation in progress. As an alterative, a user may recognize the state of the washing operation in progress or the occurrence of an error in the washing machine through a technique proposed in Japanese Patent Laid-open Publication No. Heisei 11-146991 (1999.6.2).

In the above Japanese Publication, a washing machine transmits an FM signal, and an FM receiver receives the transmitted FM signal under the condition that it always remains receivable. That is, the washing machine comprises a display unit and communication means for transmission and reception of data, through which the machine is networked with an air conditioner, television, refrigerator, computer and other electric appliances. These electric appliances each comprise communication means and a display unit similarly to the washing machine.

If the washing machine transmits information regarding its operating state and the occurrence or not of an error therein through the communication means, then the other electric appliances networked with the machine each receive the transmitted information and display it on the display unit.

However, in the above-mentioned Japanese Patent Laid-open Publication No. Heisei 11-146991, separate communication means must be provided in the washing machine and the other electric appliances to inform the operating state of the machine. Further, the washing machine and the other electric appliances must be networked with one another. Furthermore, there is a need for a receiver capable of always remaining receptive.

SUMMARY OF THE INVENTION

Therefore, the present invention has been made in view of the above problems, and it is an object of the present invention to provide a communication-controlled washing system and a method for operating the same, wherein an identifier unit is installed in each washing machine to indicate a using purpose of the associated washing machine externally, and a service provider assigns a unique ID to each washing machine over a communication network to diagnose the presence or not of a fault in each machine, provide a self-repair or visit-repair service of a fault, upgrade, modify or add a program and provide accurate and efficient information and service to each machine, thereby performing the optimum washing mode according to a use history and environmental conditions of each machine.

In accordance with one aspect of the present invention, the above and other objects can be accomplished by the provision of a communication-controlled washing system comprising a service provider for communicating with at least one washing machine, determining whether to permit the use of the washing machine and a function change thereof, receiving information regarding the operation of the machine and performing all control functions of the machine, including a use checking function, a diagnosis function and a function change function, on the basis of the received information; communication means installed in the washing machine for processing a variety of control signals from the service provider, transferring the processed control signals to the machine, performing a protocol control function and transmitting load information signals from the machine to the service provider; a washing machine controller connected to the communication means for operating the washing machine, controlling loads, performing the diagnosis function and transmitting and receiving information regarding a use history of the machine; a display unit for displaying the current operating state of the washing machine under the control of the washing machine controller; a key input unit for inputting key signals for selecting or changing washing functions according to user's operations; external memory means for performing read/write operations for data downloaded from the service provider according to a user's selection for execution of control functions associated with the downloaded data; and sense signal generation means installed in the washing machine for generating an identifier signal indicative of a using purpose of the machine and a fault sense signal indicative of the presence or not of a fault in the machine.

In accordance with another aspect of the present invention, there is provided a method for operating a communication-controlled washing system, comprising the steps of a) gaining access to a service provider through communication means and entering a unique identification character assigned to a specific washing machine to use the washing machine, the service provider adapted for permitting or restricting the use of a plurality of washing machines including the specific washing machine and performing all control functions associated with a washing operation; b) by the service provider, checking the unique identification character entered at the step a) and determining from the checked result whether to permit or restrict the use of the specific washing machine; c) by the specific washing machine, setting parameters associated with respective washing functions if its use is permitted by the service provider at the step b), performing the washing operation according to the set parameters and requesting the service provider to permit completion of the washing operation if the washing operation is completed; d) by the service provider, receiving washing information from the specific washing machine if a completion permission request is transmitted from the specific washing machine at the step c), determining from the received washing information whether the washing operation has been normally completed and transmitting completion permission information to the specific washing machine if the washing operation has been normally completed; and e) by the specific washing machine, completing the washing operation if the completion permission information is transmitted from the service provider at the step d) and then waiting for the next washing operation.

In accordance with a further aspect of the present invention, there is provided a method for operating a communication-controlled washing system, comprising the steps of a) gaining access to a service provider through communication means and installing identifier means in a specific washing machine assigned a unique identification character, the service provider adapted for permitting or restricting the use of a plurality of washing machines including the specific washing machine and performing all control functions associated with a washing operation, the identifier means adapted for generating an identifier signal indicative of a using purpose of the specific washing machine; b) by the service provider, checking the using purpose of the specific washing machine in response to the identifier signal from the identifier means to provide a specific service to the specific washing machine; and c) by the service provider, determining service contents in accordance with the result checked at the step b) and exchanging information regarding the determined service contents with the specific washing machine through the communication means.

In accordance with a further aspect of the present invention, there is provided a method for operating a communication-controlled washing system, comprising the steps of a) by a specific washing machine assigned a unique identification character, gaining access to a service provider through communication means, sensing the presence or not of a fault in a plurality of sensors and loads therein and generating a fault sense signal upon sensing the presence of the fault, the service provider adapted for permitting or restricting the use of a plurality of washing machines including the specific washing machine and performing all control functions associated with a washing operation; b) by the service provider, discriminating the type of the fault in response to the fault sense signal generated at the step a) and determining from the discriminated result whether the specific washing machine can repair the fault by itself or a visit-repair service is required to repair the fault; and c) by the service provider, transmitting self-repair information to the specific washing machine if it is determined at the step b) that the specific washing machine can repair the fault by itself, and operation disable information to the specific washing machine if it is determined at the step b) that the visit-repair service is required.

In accordance with another aspect of the present invention, there is provided a method for operating a communication-controlled washing system, comprising the steps of a) by a washing machine controller in a specific washing machine, exchanging washing control information with a service provider over a communication network and starting a washing operation of the specific washing machine in response to a key operation of a key input unit in the specific washing machine by an unspecified user, the service provider adapted for permitting or restricting the use of a plurality of washing machines including the specific washing machine and performing all control functions associated with the washing operation; b) by the washing machine controller, sensing control input parameters necessary to the washing operation of the specific washing machine if the washing operation is started at the step a) and performing a washing control mode according to the sensed control input parameters; c) by the washing machine controller, transmitting a record regarding the washing operation of the specific washing machine to the service provider if the washing control mode is completed at the step b) and by the service provider, receiving the washing operation record from the washing machine controller, accumulatively adding the received washing operation record to previous washing operation records and storing the added result; and d) by the service provider, classifying service contents according to used time zones and the number of used times and providing the classified service contents to the specific washing machine.

In accordance with yet another aspect of the present invention, there is provided a method for operating a communication-controlled washing system, comprising the steps of a) allowing at least one washing machine and a service provider to perform an initialization operation therebetween, the washing machine adapted for receiving remote control information from the service provider over a communication network, performing a washing operation according to the received remote control information and transmitting information regarding the washing operation to the service provider, the service provider adapted for communicating with the washing machine through communication means, determining whether to permit the use of the washing machine and a function change thereof, receiving the washing operation information from the washing machine and performing all control functions of the washing machine, including a use checking function, a diagnosis function and a function change function, on the basis of the received washing operation information; b) by the service provider, if the washing machine desires to download a new program about a specific function and various service information, searching for the program and information and transmitting the searched program and information to the washing machine; and c) by the washing machine, changing a preset program to the program transmitted at the step b), setting control parameters for an optimum washing mode according to the information transmitted at the step b) and performing the washing operation on the basis of the changed program and the set control parameters.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
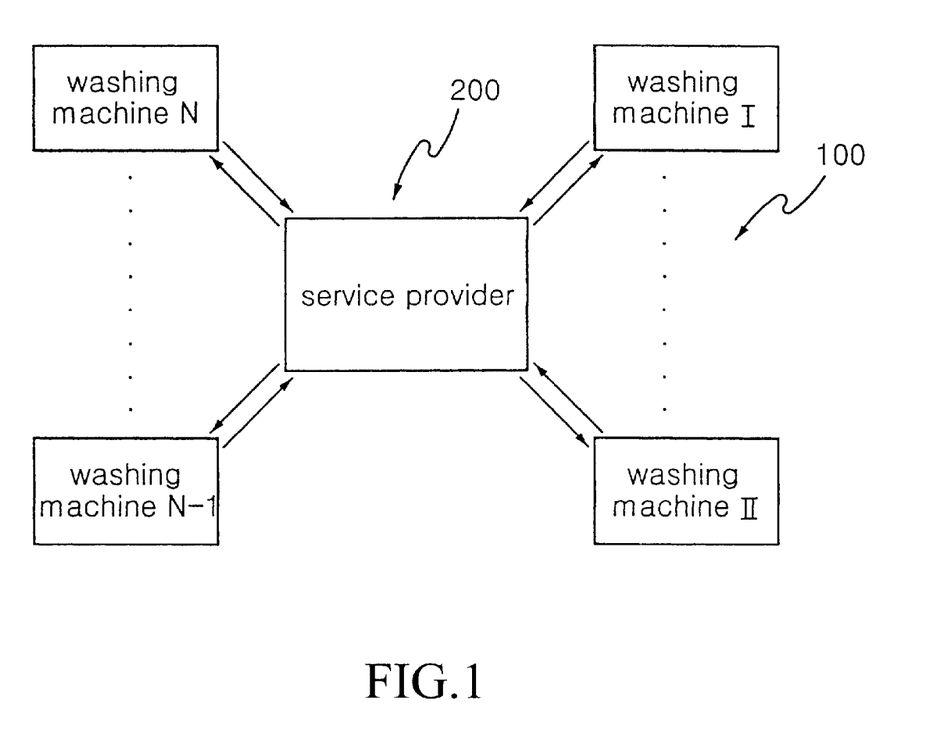
FIG. 1 is a block diagram schematically showing the construction of a communication-controlled washing system in accordance with the present invention.
Figure 2:
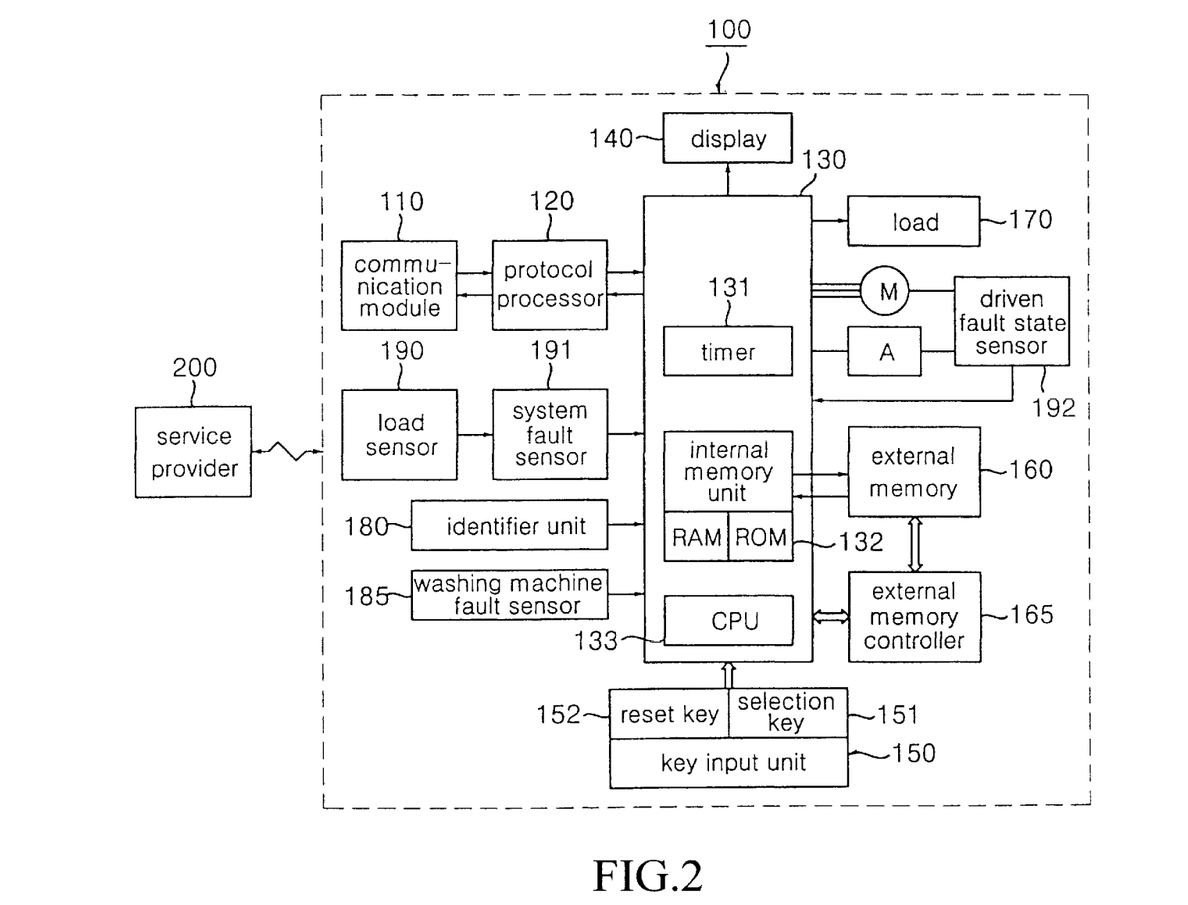
FIG. 2 is a block diagram showing in detail the construction of the communication-controlled washing system in accordance with the present invention.

FIG. 1 is a block diagram schematically showing the construction of a communication-controlled washing system in accordance with the present invention and FIG. 2 is a block diagram showing in detail the construction of the communication-controlled washing system in accordance with the present invention. As shown in these drawings, the communication-controlled washing system comprises a service provider 200 for assigning unique identification (ID) characters respectively to a plurality of remote clients, or washing machines, 100 randomly installed in arbitrary places and performing all control functions of the washing machines 100, including a diagnosis function, and communication means (110 and 120) installed in each of the washing machines 100 for processing a variety of control signals from the service provider 200, transferring the processed control signals to a washing machine controller 130 and transmitting load information signals from the washing machine controller 130 to the service provider 200.

In each of the clients or washing machines 100, as shown in FIG. 2, the washing machine controller 130 is provided to perform all control functions necessary to the general washing operation of the washing machine and generate diagnosis, progress and other load information signals in response to output information from respective components in the washing machine. The client further includes a motor M for driving a washing tub under the control of the washing machine controller 130, a load 170, such as a water supply valve or drain valve, actuated under the control of the washing machine controller 130, a key input unit 150 for inputting a user ID character and information regarding a washing course and other washing functions selected by a user and transferring the inputted user ID character and information to the washing machine controller 130, and a display unit 140 for displaying the current operating state of the washing machine 100 under the control of the washing machine controller 130.

The washing machine controller 130 includes a timer 131 for measuring a washing, rinsing or spin-drying time of the washing machine 100 or the current time, an internal memory unit 132 for storing and reading out a variety of information, and a central processing unit (CPU) 133 for performing a data arithmetic operation and logic operation to control the entire system operation. The internal memory unit 132 preferably includes a random access memory (RAM) and a read only memory (ROM).

Further, the washing machine 100 includes an external memory 160 for downloading an upgraded, modified or added version of a program related to the washing machine function control from the service provider 200 and storing the downloaded program version in the internal memory unit 132, and an external memory controller 165 for addressing the external memory 160 to read or write information from or into it.

The key input unit 150 includes a selection key 151 for selectively connecting the external memory 160 to the internal memory unit 132 to upgrade, modify or add a program stored in the internal memory unit 132, and a reset key 152 for compulsorily addressing an initial location of the internal memory unit 132. The reset key 152 need not address an initial location of the external memory 160 because the external memory controller 165 controls the addressing of the memory 160.

The communication means (110 and 120) includes a communication module 110 for transferring data between the washing machine controller 130 and the service provider 200, and a protocol processor 120 connected to the communication module 110 for encoding/decoding a variety of control signals from the service provider 200 and load information signals from the washing machine controller 130 such that they can be processed in the system.

An identifier unit 180 is further provided in the washing machine 100 to generate an identifier signal indicative of whether the machine 100 is for home use or commercial use, thereby allowing the service provider 200 to provide control information and services according to a using purpose of the machine. A washing machine fault sensor 185 is further provided in the washing machine 100 to sense the presence or not of a fault in the machine and transmit the sensed result to the service provider 200.

A load sensor 190 is further provided in the washing machine 100 to sense the level of water, a temperature, an unbalanced state and a load amount in the machine 100 and transfer the sensed results to the system. A system fault sensor 191 is further provided in the washing machine 100 to sense the presence or not of a fault in the system from the results sensed by the load sensor 190 and transfer the sensed result as a first fault sense signal to the system. A driven state fault sensor 192 is further provided in the washing machine 100 to monitor the operation of the motor M or actuator A, sense the presence or not of a fault in the motor M or actuator A from the monitored result and transfer the sensed result as a second fault sense signal to the system.

The service provider 200 transmits and receives information regarding the use, operation and fault diagnosis of the washing machine 100 through the communication means (110 and 120) to remotely control the operation of the machine 100 and provide a desired service to the machine. Namely, the service provider 200 is connected to the washing machine 100 via the communication means to control the operation of the machine 100 according to a variety of information transmitted from the machine 100 and provide a variety of services to the machine 100 so as to normally operate it. Further, the service provider 200 functions to calculate a fee for using the washing machine 100 and settle accounts for the calculated fee.

The service provider 200 receives information regarding an operation history of the washing machine 100 from the washing machine controller 130 and discriminates services by using time zones and services by using numbers on the basis of the received information. For example, for a rental washing machine, the service provider 200 may apply fee discount rates by using time zones or discriminate between charged/free services. Moreover, the service provider 200 may provide service information about the optimum control conditions to users according to the number of washing machine using times.

A description will hereinafter be given of a method for operating the communication-controlled washing system with the above-stated construction according to the present invention.

Figure 3:
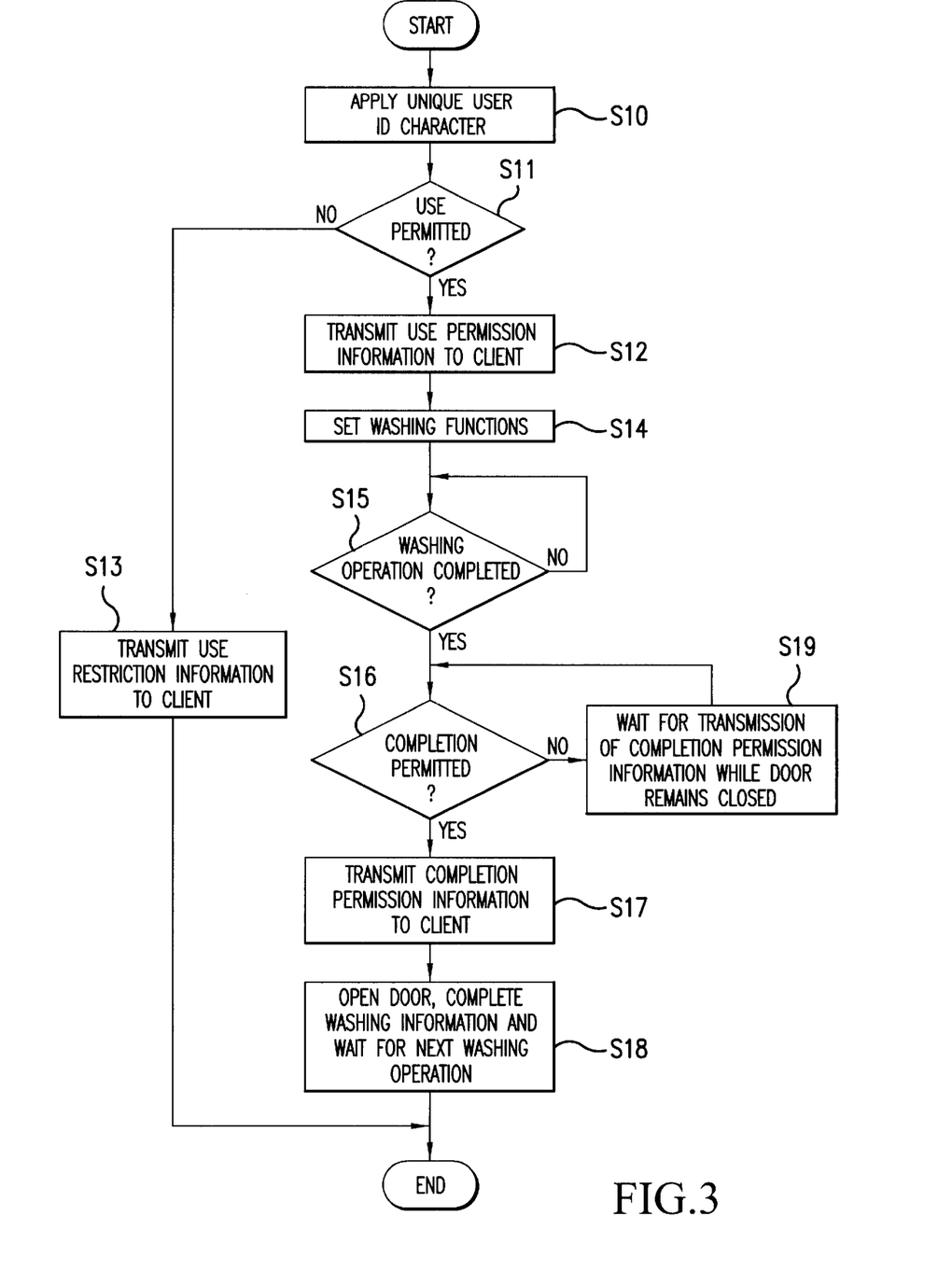
FIG. 3 is a flowchart illustrating a communication-controlled washing routine of a method for operating the communication-controlled washing system in accordance with the present invention.

FIG. 3 is a flowchart illustrating a communication-controlled washing routine of the method for operating the communication-controlled washing system in accordance with the present invention. At the first step S10, if the user applies a unique user ID character to the washing machine controller 130 through the key input unit 150 to operate the client or washing machine 100, then the unique user ID character is transmitted to the service provider 200 through the communication module 110 and protocol processor 120.

At the second step S11, the service provider 200 checks the transmitted unique user ID character and determines from the checked result whether to permit or restrict the use of the washing machine 100.

If the use of the washing machine 100 is determined to be permitted at the above second step S11, the service provider 200 transmits use permission information to the machine 100 at the third step S12. However, at the fourth step S13, if the use of the washing machine 100 is determined to be restricted at the above second step S11, then the service provider 200 determines whether the restriction of the use of the machine 100 has been successively determined at least N times. In the case where the restriction of the use of the washing machine 100 is determined to have been successively determined at least N times, the service provider 200 informs the client or machine 100 that it is restricted from use due to an erroneous entry of the unique user ID character or other reasons.

The number of use restriction determinations at the above fourth step S13 is preferably three.

At the fifth step S14, the client or washing machine inspects the unique user ID character upon receiving washing machine use restriction information from the service provider 200. Alternatively, upon receiving washing machine use permission information from the service provider 200, the client inputs data regarding functions for a washing operation, such as a washing time, course, etc., selected by the user through the key input unit 150.

At the sixth step S15, the client sequentially performs a washing mode, rinsing mode and spin-drying mode according to items set by the user at the above fifth step S14 and then determines whether the washing operation has been completed.

At the seventh step S16, if it is determined at the above sixth step S15 that the washing operation has been completed, the client inquires of the service provider 200 about whether to permit the completion of the washing operation. Alternatively, upon determining at the above sixth step S15 that the washing operation has not been completed, the client returns to the above fifth step S14 to complete the washing operation according to the set time or coarse.

At the eighth step S17, if the client inquires about whether to permit the completion of the washing operation at the above seventh step S16, the service provider 200 checks a period of used time or load amount of the washing machine 100 and then transmits completion permission information to the client in accordance with the checked result.

At the ninth step S18, if the client receives the completion permission information transmitted from the service provider 200 at the above eighth step S17, then it opens the door of the washing machine 100, allows the user to draw laundry, enters a power saving mode and waits for the next washing operation. However, if the service provider 200 does not transmit the completion permission information at the above eighth step S17, the client proceeds to the tenth step S19 to return to the above seventh step S16 under the condition that the door of the washing machine 100 remains closed and then wait for the transmission of the completion permission information from the service provider 200.

Figure 4:
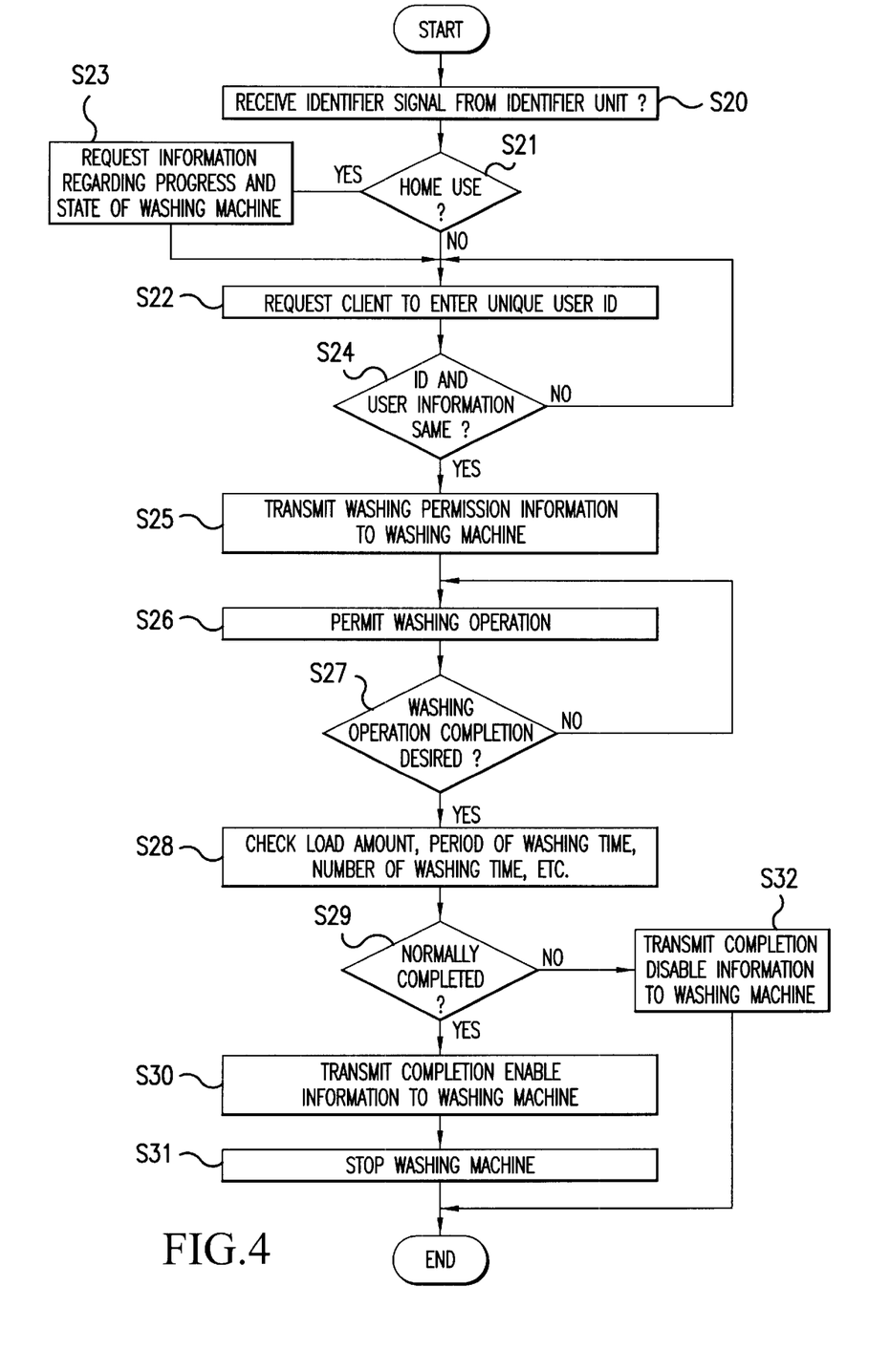
FIG. 4 is a flowchart illustrating a communication-controlled washing machine identification routine of the method for operating the communication-controlled washing system in accordance with the present invention.

FIG. 4 is a flowchart illustrating a communication-controlled washing machine identification routine of the method for operating the communication-controlled washing system in accordance with the present invention. At the first step S20, the service provider 200 receives an identifier signal from the identifier unit 180 of the specific washing machine 100 connected through the communication means to provide services or other information to the machine 100.

At the second step S21, the service provider 200 determines from the identifier signal from the identifier unit 180 whether the washing machine 100 is for home use. At the third step S22, if it is determined at the above second step S21 that the washing machine 100 is not for home use, the service provider 200 recognizes that the washing machine 100 is for commercial use and then requests the client to enter a unique user ID assigned to the washing machine user.

In the case where it is determined at the above second step S21 that the washing machine 100 is for home use, the service provider 200 receives information regarding the progress and state of the washing machine 100 from the client at the fourth step S23 and then proceeds to the above third step S22.

At the fifth step S24, the service provider 200 searches a user information database (DB) for user information corresponding to the user ID entered at the above third step S22 and then determines whether the entered ID is the same as the searched user information.

At the sixth step S25, if it is determined at the above fifth step S24 that the entered ID is the same as the searched user information, the service provider 200 transmits washing permission information to the washing machine 100. Alternatively, in the case where it is determined at the above fifth step S24 that the entered ID is not the same as the searched user information, the service provider 200 returns to the above third step S22 to request the client to re-enter a correct user ID.

At the seventh step S26, the washing machine 100 allows the user to select a washing coarse, the level of water and other washing functions in response to the washing permission information from the service provider 200 and then sequentially performs a washing mode, rinsing mode and spin-drying mode according to the washing functions selected by the user. At the eighth step S27, the service provider 200 monitors the washing operation of the washing machine 100 to determine whether the machine 100 desires to complete the washing operation.

Upon determining at the above eighth step S27 that the washing machine 100 desires to complete the washing operation, the service provider 200 checks a load amount, a period of washing time, the number of washing times, etc. at the ninth step S28 and then determines on the basis of the checked results whether the washing operation can be normally completed, at the tenth step S29.

If it is determined at the above tenth step S29 that the washing operation can be normally completed, the service provider 200 transmits completion enable information to the washing machine 100 at the eleventh step S30. At the twelfth step S31, the washing machine 100 completes the washing operation in response to the completion enable information from the service provider 200 and then waits for the next washing operation.

On the other hand, in the case where it is determined at least three times at the above tenth step S29 that the washing operation cannot be normally completed, the service provider 200 transmits completion disable information to the washing machine 100 at the thirteenth step S32.

Figure 5:
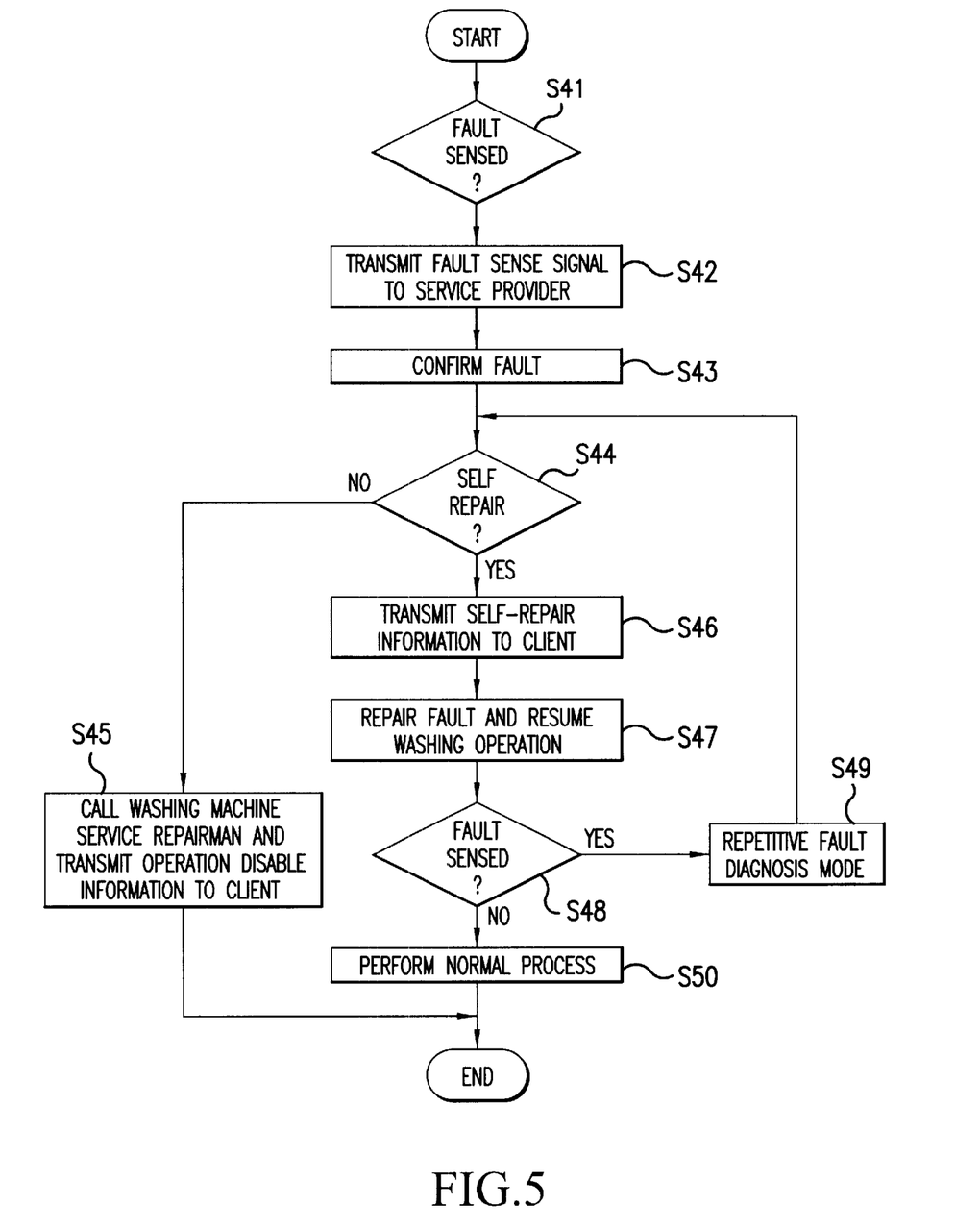
FIG. 5 is a flowchart illustrating a communication-controlled washing machine remote fault diagnosis routine of the method for operating the communication-controlled washing system in accordance with the present invention.

FIG. 5 is a flowchart illustrating a communication-controlled washing machine remote fault diagnosis routine of the method for operating the communication-controlled washing system in accordance with the present invention.

At the first step S41, the washing machine controller 130 in the client 100 determines the presence or not of a fault in the load sensor 190 or the motor M or actuator A in response to the first or second fault sense signal from the system fault sensor 191 or driven state fault sensor 192.

If the washing machine controller 130 in the client 100 determines the presence of a fault in the load sensor 190 or the motor M or actuator A at the above first step S41, then it generates a fault sense signal and transmits it to the service provider 100 at the second step S42. At the third step S43, the service provider 200 confirms the presence of a fault in the corresponding washing machine in response to the fault sense signal transmitted from the client 100 at the above second step S42.

At the fourth step S44, the service provider 200 discriminates the type of a fault in the washing machine confirmed at the above third step S43 and then determines from the discriminated result whether the client 100 can repair the fault by itself.

At the fifth step S45, if it is determined at the above fourth step S44 that the client 100 cannot repair the fault by itself, the service provider 200 determines that a washing machine service repairman must be called to repair the fault and then transmits operation disable information to the client 100.

While transmitting the operation disable information to the client 100 at the above fifth step S45, the service provider 200 may together transmit a telephone number of a service center nearest to the client 100 or a telephone number of a service repairman in the service center.

Further, the service provider 200 may output to the display unit 140 of the washing machine a message about whether the client 100 desires a service call. In this case, if the client 100 desires the service call through a user's key operation, then the service provider 200 may instruct a service repairman to visit at once.

On the other hand, upon determining at the above fourth step S44 that the client 100 can repair the fault by itself, the service provider 200 transmits self-repair information to the client 100 to enable the washing machine user to personally repair the fault, at the sixth step S46.

At the seventh step S47, the self-repair information transmitted from the service provider 200 at the above sixth step S46 is displayed on the display unit 140 of the client 100, and the user repairs the fault on the basis of the displayed self-repair information and then resumes the operation of the washing machine.

Thereafter, at the eighth step S48, the service provider 200 determines whether the client 100 informs a fault of the same type as that confirmed at the above third step S43. Upon determining at the above eighth step S48 that the client 100 informs the fault of the same type, the service provider 200 enters a repetitive fault diagnosis mode at the ninth step S49 to return to the above fourth step S44.

On the other hand, if it is determined at the above eighth step S48 that the client 100 does not inform the fault of the same type or if the washing machine controller 130 in the client 100 determines the absence of a fault in the load sensor 190 or the motor M or actuator A at the above first step S41, both the client 100 and service provider 200 performs a normal process at the tenth step S50.

Figure 6:
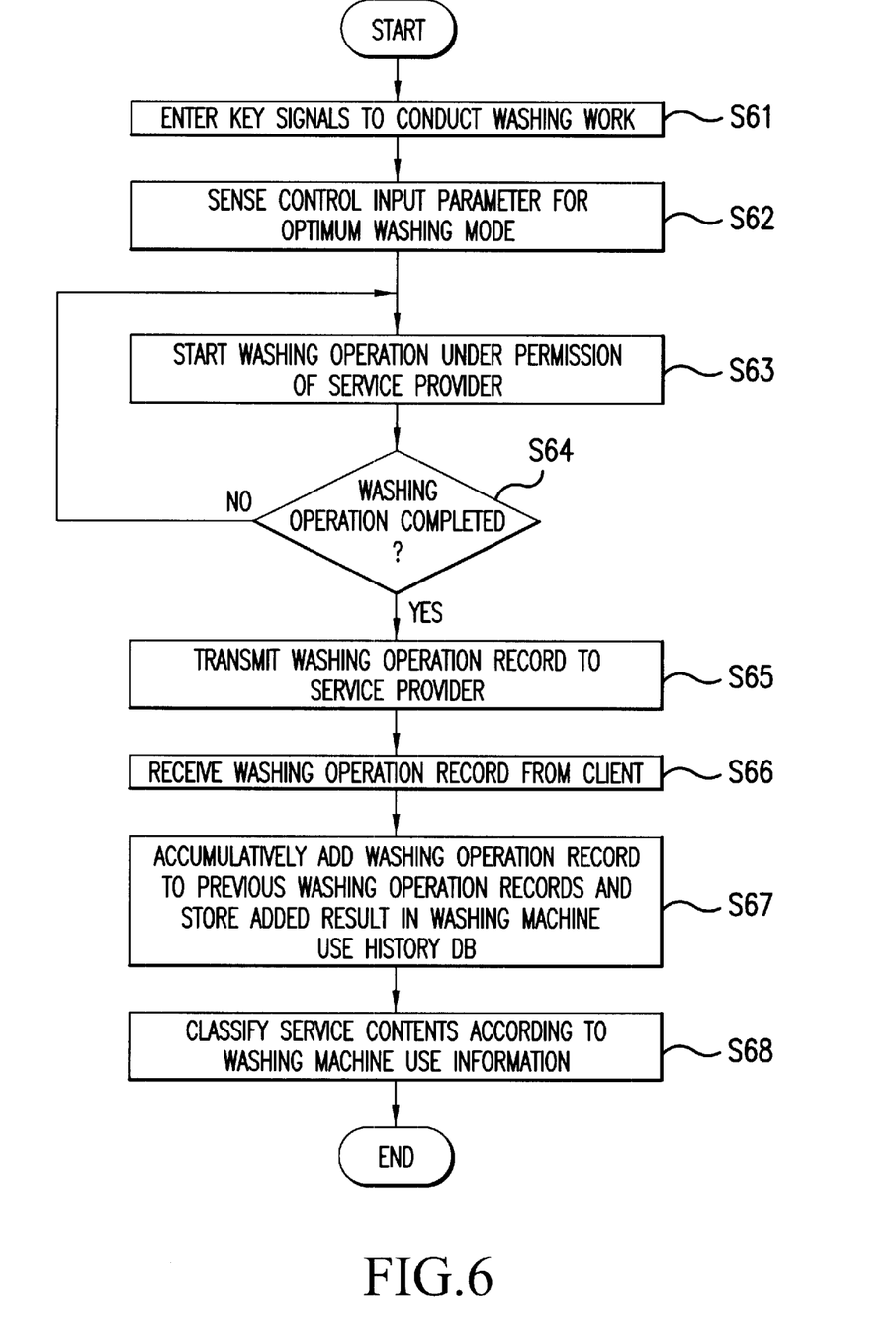
FIG. 6 is a flowchart illustrating a communication-controlled washing machine use history monitoring routine of the method for operating the communication-controlled washing system in accordance with the present invention.

FIG. 6 is a flowchart illustrating a communication-controlled washing machine use history monitoring routine of the method for operating the communication-controlled washing system in accordance with the present invention. At the first step S61, in order to conduct washing work, the user puts laundry into the washing tub and then selects a desired washing function through the key input unit 150. At the second step S62, the washing machine controller 130 senses control input parameters such as the amount of load, the level of water, the amount of detergent and the like. Thereafter, at the third step S63, the washing machine controller 130 sets the optimum washing condition and then starts a washing operation based on the washing function selected by the user if the service provider 200 permits the use of the washing machine.

Thereafter, the washing machine controller 130 determines at the fourth step S64 whether the washing operation has been completed. If it is determined at the above fourth step S64 that the washing operation has not been completed, the washing machine controller 130 returns to the above third step S63 to perform the washing operation continuously. However, upon determining at the above fourth step S64 that the washing operation has been completed, the washing machine controller 130 extracts a record regarding the completed washing operation and transmits the extracted record to the service provider 200 at the fifth step S65.

At the sixth step S66, the service provider 200 receives the washing operation record transmitted at the above fifth step S65. Then, at the seventh step S67, the service provider 200 accumulatively adds the received washing operation record to previous washing operation records and stores the added result in a washing machine use history DB.

At the eighth step S68, the service provider 200 extracts the entire washing machine use information from the washing operation records accumulatively stored in the use history DB and then classifies service contents according to used time zones and the number of used times. The service contents preferably relate to discount rates by using time zones, charged/free services and control information necessary to the optimum operating condition of the washing machine.

Figure 7:
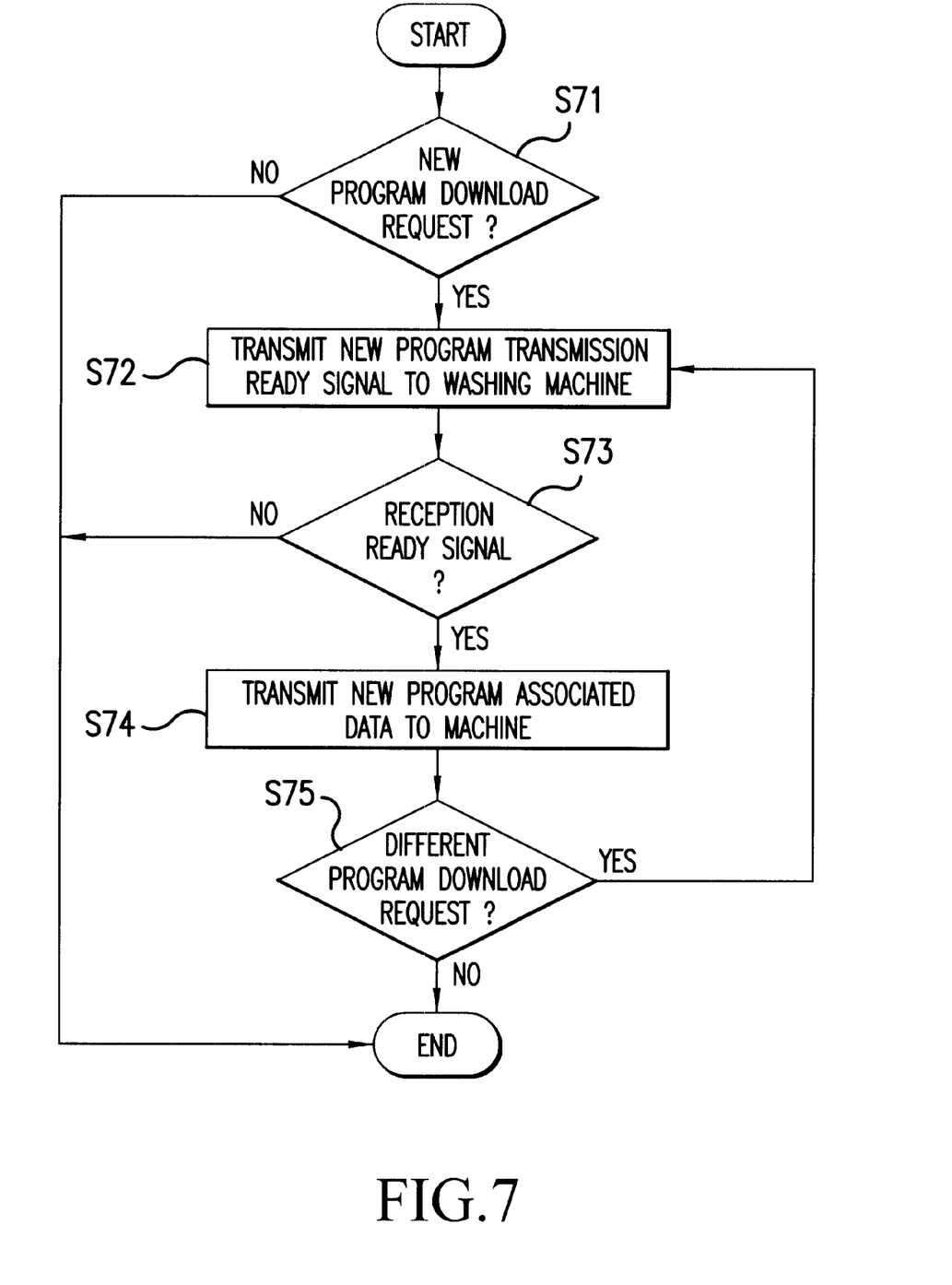
FIG. 7 is a flowchart illustrating a program update routine of the method for operating the communication-controlled washing system in accordance with the present invention.

FIG. 7 is a flowchart illustrating a program update routine of the method for operating the communication-controlled washing system in accordance with the present invention, wherein the communication-controlled washing machine 100 downloads a new program from the service provider 200. At the first step S71, the service provider 200 determines whether the washing machine 100 has transmitted a new program download request to upgrade a program associated with a specific function.

Upon determining at the above first step S71 that the washing machine 100 has transmitted the new program download request, the service provider 200 generates a new program transmission ready signal and transmits it to the washing machine controller 130 in the machine 100 through the communication module 110 and protocol processor 120 at the second step S72.

Then, the service provider 200 determines at the third step S73 whether the washing machine 100 has transmitted a reception ready signal in response to the transmission ready signal transmitted at the above second step S72. Upon determining at the above third step S73 that the washing machine 100 has transmitted the reception ready signal, the service provider 200 transmits new program associated data to the machine 100 at the fourth step S74.

Thereafter, the service provider 200 determines at the fifth step S75 whether the washing machine 100 has transmitted a different program download request. If it is determined at the above fifth step S75 that the washing machine 100 has transmitted the different program download request, the service provider 200 returns to the above second step S72 to repeat the above second to fourth steps S72 through S74. Alternatively, in the case where it is determined at the above fifth step S75 that the washing machine 100 has not transmitted the different program download request, the service provider 200 ends the program download operation.

On the other hand, in the case where it is determined at the above first step S71 that the washing machine 100 has not transmitted the new program download request or where it is determined at the above third step S73 that the washing machine 100 has not transmitted the reception ready signal, the service provider 200 ends the program download operation.

Figure 8:
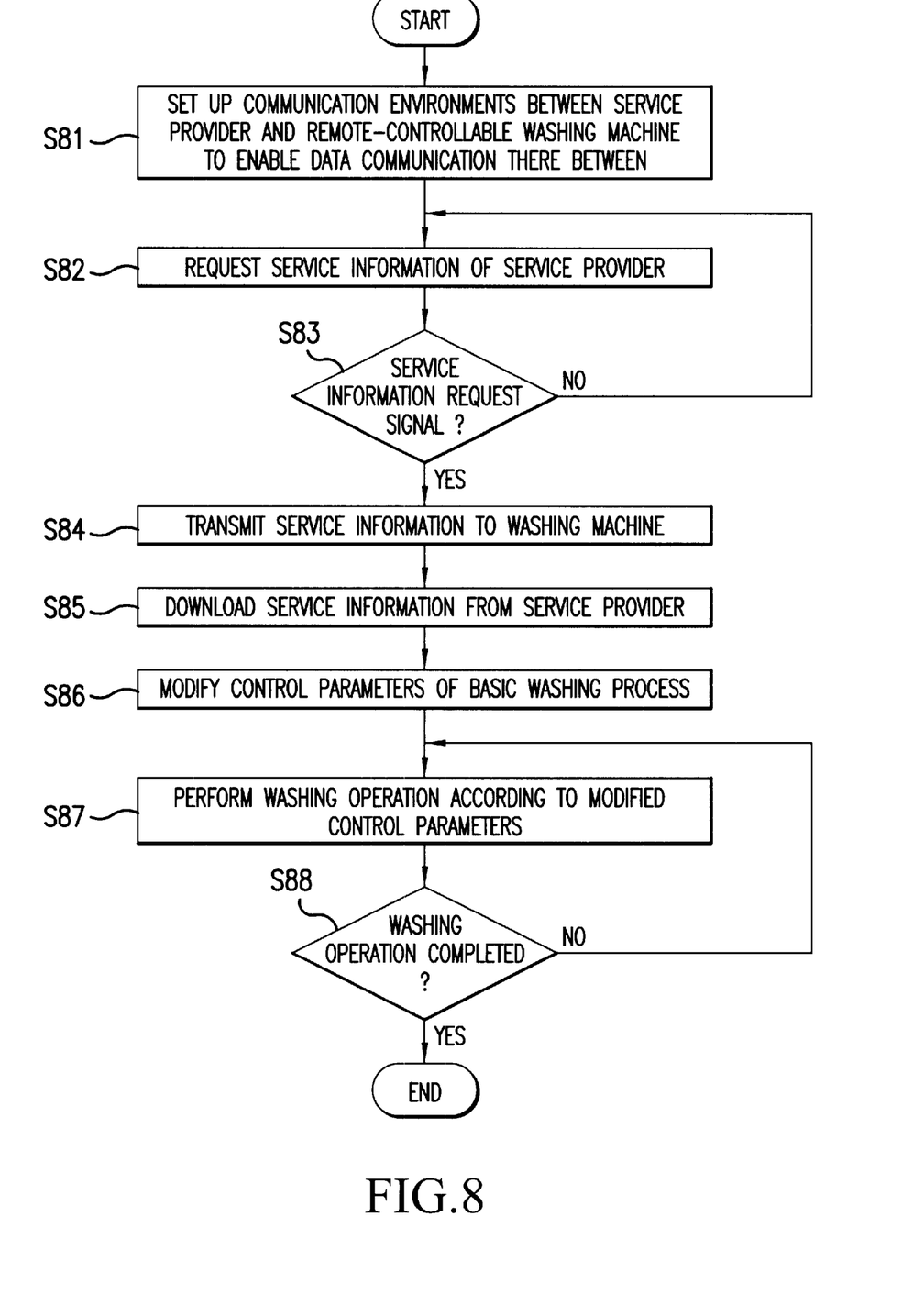
FIG. 8 is a flowchart illustrating a communication-controlled washing machine control routine of the method for operating the communication-controlled washing system in accordance with the present invention.

FIG. 8 is a flowchart illustrating a communication-controlled washing machine control routine of the method for operating the communication-controlled washing system in accordance with the present invention.

At the first step S81, the washing machine 100 and service provider 200 set up communication environments therebetween to enable data communication therebetween. At the second step S82, the washing machine 100 requests service information associated with a washing operation, such as the current weather, time, season, etc., of the service provider 200 through the protocol processor 120 and communication module 110.

The service provider 200 determines at the third step S83 whether it has received a service information request signal from the washing machine 100. Unless the service provider 200 has received the service information request signal from the washing machine 100, it returns to the above second step S82. However, if the service provider 200 has received the service information request signal from the washing machine 100, then it obtains service information from information provision organizations such as a meteorological office and transmits the obtained service information to the machine 100 at the fourth step S84.

At the fifth step S85, the washing machine 100 downloads the service information transmitted from the service provider 200 via the communication module 110 and protocol processor 120 and then stores it in a specific location of the external memory 160 addressed by the external memory controller 165.

At the sixth step S86, the user connects the external memory 160 to the internal memory 132 by pushing the selection key 151. As a result, the washing machine 100 modifies control parameters of a basic washing process pre-stored in the internal memory 132 according to the service information stored in the external memory 160 to create a new optimum washing mode.

That is, at the sixth step S86, for example, if the washing time zone is night, the washing machine 100 may change a washing noise coarse to a low noise level based on the service information and then modify the associated control parameter of the basic washing process. In the case where the washing time zone is day, the washing machine 100 may set the washing noise coarse to a normal noise level and perform the basic washing process as it is.

Further, the washing machine may adjust the temperature of washing water, a period of washing time or the volume of water flow according to the washing season on the basis of the service information. In particular, for a single family house, the washing machine will set the washing conditions day by day on the basis of the service information because it generally has no spin-drier.

At the seventh step S87, the washing machine 100 performs the washing operation in the washing mode created at the above sixth step S86. Then, the washing machine 100 determines at the eighth step S88 whether the washing operation has been completed.

Upon determining at the above eighth step S88 that the washing operation has been completed, the washing machine 100 ends all washing work. However, unless the washing operation has been completed at the above eighth step S88, the washing machine 100 returns to the above seventh step S87 to perform the washing operation continuously.

As apparent from the above description, the present invention provides a communication-controlled washing system and a method for operating the same, wherein a service provider controls the use, operation completion, operation progress and fault diagnosis of a plurality of washing machines individually over a communication network, resulting in a significant reduction in time and effort required for users or managers to limit the use of machines, upgrade programs or repair faults. Further, the optimum washing mode can be performed according to a use history and environmental conditions of each machine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A communication-controlled washing system comprising:

a service provider for communicating with at least one washing machine, determining whether to permit the use of said washing machine and a function change thereof, receiving information regarding the operation of said machine and performing all control functions of said machine, including a use checking function, a diagnosis function and a function change function, on the basis of the received information;

communication means installed in said washing machine for processing a variety of control signals from said service provider, transferring the processed control signals to said machine, performing a protocol control function and transmitting load information signals from said machine to said service provider;

a washing machine controller connected to said communication means for operating said washing machine, controlling loads, performing said diagnosis function and transmitting and receiving information regarding a use history of said machine;

a display unit for displaying the current operating state of said washing machine under the control of said washing machine controller;

a key input unit for inputting key signals for selecting or changing washing functions according to user's operations;

external memory means for performing read/write operations for data downloaded from said service provider according to a user's selection for execution of control functions associated with the downloaded data; and sense signal generation means installed in said washing machine for generating an identifier signal indicative of a using purpose of said machine and a fault sense signal indicative of the presence or not of a fault in said machine.

2. The communication-controlled washing system as set forth in claim 1, wherein said service provider is connected to said washing machine via said communication means to determine whether to permit the use/operation completion of said machine, and assign a unique identification character to said machine.

3. The communication-controlled washing system as set forth in claim 1, wherein said service provider is adapted to transmit and receive information regarding the use, operation and fault diagnosis of said washing machine through said communication means to remotely control the operation of said machine and provide a desired service to said machine.

4. The communication-controlled washing system as set forth in claim 1 or claim 3, wherein said service provider is adapted to receive said washing machine use history information transmitted from said washing machine controller, classify service contents according to used time zones and used functions on the basis of the received use history information and generate control information to said washing machine on the basis of the classified service contents.

5. The communication-controlled washing system as set forth in claim 1, wherein said service provider is adapted to control the use of said washing machine according to a variety of information transmitted from said machine, provide a variety of services to said machine so as to normally operate it, calculate a fee for using said machine and settle accounts for the calculated fee.

6. The communication-controlled washing system as set forth in claim 1, wherein said communication means includes:

a communication module for transmitting and receiving information between said service provider and said washing machine; and a protocol processor for performing said protocol control function for the information transmission and reception through said communication module.

7. The communication-controlled washing system as set forth in claim 1, wherein said external memory means includes:

an external memory connected to said washing machine controller according to the user's selection for performing said read/write operations for the data downloaded from said service provider; and an external memory controller for addressing said external memory and controlling the processing of data in respective addresses of said external memory.

8. The communication-controlled washing system as set forth in claim 1, wherein said sense signal generation means includes:

an identifier unit for generating said identifier signal indicative of the using purpose of said washing machine, thereby allowing said service provider to provide control information and services according to the using purpose of said machine; and a washing machine fault sensor for sensing the presence or not of a fault in said machine and outputting the sensed result as said fault sense signal.

9. A method for operating a communication-controlled washing system, comprising the steps of:

a) gaining access to a service provider through communication means and entering a unique identification character assigned to a specific washing machine to use the washing machine, said service provider adapted for permitting or restricting the use of a plurality of washing machines including said specific washing machine and performing all control functions associated with a washing operation;

b) by said service provider, checking said unique identification character entered at said step a) and determining from the checked result whether to permit or restrict the use of said specific washing machine;

c) by said specific washing machine, setting parameters associated with respective washing functions if its use is permitted by said service provider at said step b), performing the washing operation according to the set parameters and requesting said service provider to permit completion of said washing operation if said washing operation is completed;

d) by said service provider, receiving washing information from said specific washing machine if a completion permission request is transmitted from said specific washing machine at said step c), determining from the received washing information whether said washing operation has been normally completed and transmitting completion permission information to said specific washing machine if said washing operation has been normally completed; and e) by said specific washing machine, completing said washing operation if said completion permission information is transmitted from said service provider at said step d) and then waiting for the next washing operation.

10. The method as set forth in claim 9, wherein said step c) includes the steps of:

c-1) by said specific washing machine, re-entering said unique identification character if its use is restricted by said service provider at said step b) and again requesting said service provider to permit its use; and c-2) by said service provider, transmitting use disable information to said specific washing machine upon restricting the use of said specific washing machine even if said specific washing machine re-enters said unique identification character a predetermined number of times.

11. The method as set forth in claim 9, wherein said step d) includes the step of by said service provider, checking said washing information, determining from the checked result whether said washing operation has been normally completed, transmitting said completion permission information to said specific washing machine if said washing operation has been normally completed and settling accounts for a fee for using said specific washing machine.

12. The method as set forth in claim 9, wherein said step e) includes the steps of:
  e-1) by said specific washing machine, completing said washing operation if said completion permission information is transmitted from said service provider at said step d), entering a power saving mode and then waiting for the next washing operation; and
  e-2) by said specific washing machine, keeping its door closed if completion restriction information is transmitted from said service provider at said step d) and inquiring of said service provider about whether to permit the completion of said washing operation.

13. A method for operating a communication-controlled washing system, comprising the steps of:
  a) gaining access to a service provider through communication means and installing identifier means in a specific washing machine assigned a unique identification character, said service provider adapted for permitting or restricting the use of a plurality of washing machines including said specific washing machine and performing all control functions associated with a washing operation, said identifier means adapted for generating an identifier signal indicative of a using purpose of said specific washing machine;
  b) by said service provider, checking the using purpose of said specific washing machine in response to said identifier signal from said identifier means to provide a specific service to said specific washing machine; and
  c) by said service provider, determining service contents in accordance with the result checked at said step b) and exchanging information regarding the determined service contents with said specific washing machine through said communication means.

14. The method as set forth in claim 13, wherein said step c) includes the step of by said service provider, receiving information regarding the progress and state of said specific washing machine if said specific washing machine is for home use, exchanging various service information with said specific washing machine upon receiving a unique user identification character from said specific washing machine, determining whether to permit the use/operation completion of said specific washing machine upon receiving said unique user identification character under the condition that said specific washing machine is for commercial use and controlling the operation of said specific washing machine in accordance with the determined result.

15. A method for operating a communication-controlled washing system, comprising the steps of:
  a) by a specific washing machine assigned a unique identification character, gaining access to a service provider through communication means, sensing the presence or not of a fault in a plurality of sensors and loads therein and generating a fault sense signal upon sensing the presence of the fault, said service provider adapted for permitting or restricting the use of a plurality of washing machines including said specific washing machine and performing all control functions associated with a washing operation;
  b) by said service provider, discriminating the type of said fault in response to said fault sense signal generated at said step a) and determining from the discriminated result whether said specific washing machine can repair said fault by itself or a visit-repair service is required to repair said fault; and
  c) by said service provider, transmitting self-repair information to said specific washing machine if it is determined at said step b) that said specific washing machine can repair said fault by itself, and operation disable information to said specific washing machine if it is determined at said step b) that said visit-repair service is required.

16. The method as set forth in claim 15, wherein said step c) includes the steps of:
  c-1) by said service provider, displaying said self-repair information on a display unit of said specific washing machine to enable a washing machine user to personally repair said fault on the basis of the displayed self-repair information, if it is determined at said step b) that said specific washing machine can repair said fault by itself; and
  c-2) by said service provider, determining whether the presence of a fault in said sensors and loads in said specific washing machine is sensed when said washing operation is resumed after the self-repair is completed at said step c-1).

17. The method as set forth in claim 15, wherein said step c) includes the step of by said service provider, transmitting a telephone number of a service center nearest to said specific washing machine and other necessary information to said specific washing machine if it is determined at said step b) that said visit-repair service is required.

18. A method for operating a communication-controlled washing system, comprising the steps of:
  a) by a washing machine controller in a specific washing machine, exchanging washing control information with a service provider over a communication network and starting a washing operation of said specific washing machine in response to a key operation of a key input unit in said specific washing machine by an unspecified user, said service provider adapted for permitting or restricting the use of a plurality of washing machines including said specific washing machine and performing all control functions associated with the washing operation;
  b) by said washing machine controller, sensing control input parameters necessary to said washing operation of said specific washing machine if said washing operation is started at said step a) and performing a washing control mode according to the sensed control input parameters;
  c) by said washing machine controller, transmitting a record regarding said washing operation of said specific washing machine to said service provider if said washing control mode is completed at said step b) and by said service provider, receiving said washing operation record from said washing machine controller, accumulatively adding the received washing operation record to previous washing operation records and storing the added result; and
  d) by said service provider, classifying service contents according to used time zones and the number of used times and providing the classified service contents to said specific washing machine.

19. A method for operating a communication-controlled washing system, comprising the steps of:
  a) allowing at least one washing machine and a service provider to perform an initialization operation therebetween, said washing machine adapted for receiving remote control information from said service provider over a communication network, performing a washing operation according to the received remote control information and transmitting information regarding the washing operation to said service provider, said service provider adapted for communicating with said washing machine through communication means, determining whether to permit the use of said washing machine and a function change thereof, receiving said washing operation information from said washing machine and performing all control functions of said washing machine, including a use checking function, a diagnosis function and a function change function, on the basis of the received washing operation information;
  b) by said service provider, if said washing machine desires to download a new program about a specific function and various service information, searching for said program and information and transmitting the searched program and information to said washing machine; and
  c) by said washing machine, changing a preset program to said program transmitted at said step b), setting control parameters for an optimum washing mode according to said information transmitted at said step b) and performing said washing operation on the basis of the changed program and the set control parameters.

20. The method as set forth in claim 19, wherein said service information includes weather, time and season information and wherein said step b) includes the step of by said service provider, searching a variety of information provision organizations for said service information and transmitting the searched service information to said washing machine.

21. The method as set forth in claim 19 or claim 20, wherein said step c) includes the step of by said washing machine, modifying preset control parameters for a current washing mode suitably for ambient environmental conditions according to said service information transmitted at said step b) so as to create said optimum washing mode.

* * * * *